(12) United States Patent
Windebank et al.

(10) Patent No.: US 10,093,849 B2
(45) Date of Patent: Oct. 9, 2018

(54) PROPPANTS AND ANTI-FLOWBACK ADDITIVES COMPRISING FLASH CALCINED CLAY, METHODS OF MANUFACTURE, AND METHODS OF USE

(71) Applicant: IMERYS OILFIELD MINERALS, INC., Roswell, GA (US)

(72) Inventors: Mark Windebank, Par (GB); Thomas Parias, Rhodes Sint Genesius (BE); Jarrod Hart, Truro (GB)

(73) Assignee: Imerys Oilfield Minerals, Inc., Roswell, GA (US)

( * ) Notice: Subject to any disclaimer, the term of this patent is extended or adjusted under 35 U.S.C. 154(b) by 774 days.

(21) Appl. No.: 14/405,493

(22) PCT Filed: Jun. 3, 2013

(86) PCT No.: PCT/US2013/043853
§ 371 (c)(1),
(2) Date: Dec. 4, 2014

(87) PCT Pub. No.: WO2013/184558
PCT Pub. Date: Dec. 12, 2013

(65) Prior Publication Data
US 2015/0184064 A1 Jul. 2, 2015

Related U.S. Application Data

(60) Provisional application No. 61/655,231, filed on Jun. 4, 2012.

(51) Int. Cl.
*C09K 8/80* (2006.01)
*E21B 43/26* (2006.01)
(Continued)

(52) U.S. Cl.
CPC .............. *C09K 8/805* (2013.01); *B28B 11/00* (2013.01); *C04B 33/04* (2013.01);
(Continued)

(58) Field of Classification Search
None
See application file for complete search history.

(56) References Cited

U.S. PATENT DOCUMENTS 3,021,195 A 2/1962 Podschus et al.
3,497,008 A 2/1970 Graham et al.
(Continued)

FOREIGN PATENT DOCUMENTS

WO WO 99/24360 5/1999
WO WO 2009/027841 A2 3/2009
WO WO 2013/184558 A1 12/2013

OTHER PUBLICATIONS

International Search Report and Written Opinion dated Oct. 21, 2013, in PCT International Application No. PCT/US2013/043853, filed Jun. 3, 2013.
(Continued)

*Primary Examiner* — John J Figueroa
(74) *Attorney, Agent, or Firm* — Finnegan, Henderson, Farabow, Garrett & Dunner LLP

(57) ABSTRACT

Spherical and rod-shaped proppants and anti-flowback agents made from flash calcined clays, such as flash calcined kaolin, possess high strength and high conductivity. The starting material may optionally be milled to achieve better compacity and crush resistance in the final proppant or anti-flowback agent. A fracturing fluid may include the rods or spheres alone, or in combination with each other or other proppants or anti-flowback agents of different shapes.

20 Claims, 1 Drawing Sheet

(51) Int. Cl.
  *B28B 11/00* (2006.01)
  *C04B 33/04* (2006.01)
  *C04B 35/626* (2006.01)
(52) U.S. Cl.
  CPC .... *C04B 35/6262* (2013.01); *C04B 35/62675* (2013.01); *C04B 35/62695* (2013.01); *C09K 8/80* (2013.01); *E21B 43/26* (2013.01); *C04B 2235/528* (2013.01); *C04B 2235/5296* (2013.01); *C04B 2235/5436* (2013.01); *C04B 2235/5472* (2013.01); *C04B 2235/656* (2013.01); *C04B 2235/6562* (2013.01); *C04B 2235/77* (2013.01); *C04B 2235/94* (2013.01); *C04B 2235/96* (2013.01)

(56) References Cited

U.S. PATENT DOCUMENTS

| | | |
|---|---|---|
| 3,620,789 A | 11/1971 | Solomon |
| 4,068,718 A | 1/1978 | Cooke, Jr. et al. |
| 4,427,068 A | 1/1984 | Fitzgibbon |
| 4,921,820 A * | 5/1990 | Rumpf .................. C04B 33/04 166/280.2 |
| 5,030,603 A * | 7/1991 | Rumpf .................. C04B 33/04 166/280.2 |
| 5,175,133 A * | 12/1992 | Smith .................. C04B 35/111 423/625 |
| 5,240,654 A | 8/1993 | Smith et al. |
| 5,420,174 A | 5/1995 | Dewprashad |
| 6,753,299 B2 | 6/2004 | Lunghofer et al. |
| 2005/0022991 A1* | 2/2005 | Rao .................. E21B 43/04 166/280.2 |
| 2005/0239934 A1 | 10/2005 | Agra-Gutierrez et al. |
| 2008/0058228 A1* | 3/2008 | Wilson .................. C04B 33/04 507/140 |
| 2009/0062154 A1 | 3/2009 | Windebank et al. |
| 2011/0111990 A1* | 5/2011 | Pershikova ............. C04B 35/01 507/219 |

OTHER PUBLICATIONS

Meinhold, Richard H.; Atakül, Hüsnü; Davies, Thomas W.; and Slade, Robert C.T.; "Flash Calcines of Kaolinite: Kinetics of Isothermal Dehydroxylation of Partially Dehydroxylated Flash Calcines and of Flash Calcination Itself", Journal of Materials Chemistry, vol. 2, No. 9, 1992, pp. 913-921, XP55231347.

Extended European Search Report dated Dec. 3, 2015, for related European Patent Application No. 13801268.7.

* cited by examiner

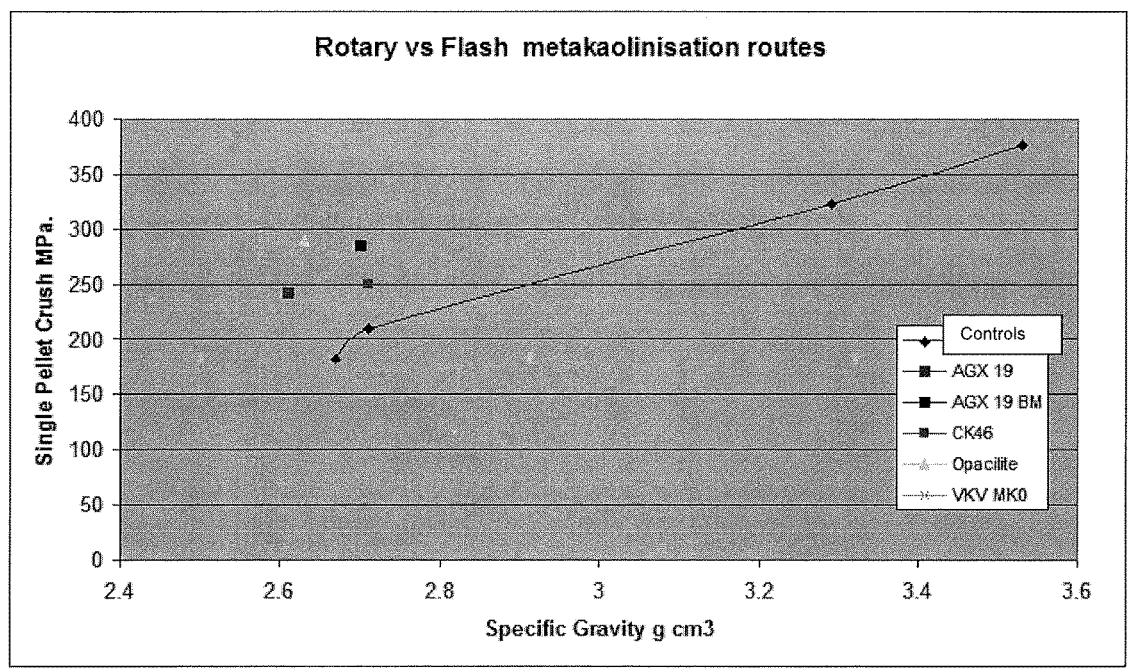

PROPPANTS AND ANTI-FLOWBACK ADDITIVES COMPRISING FLASH CALCINED CLAY, METHODS OF MANUFACTURE, AND METHODS OF USE

CLAIM OF PRIORITY/INCORPORATION BY REFERENCE

This application is a U.S. national stage entry under 35 U.S.C. § 371 from PCT International Application No. PCT/US2013/043853, filed Jun. 3, 2013. Which claims priority to and the benefit of the filing date of U.S. Provisional Application No. 61/655,231, filed Jun. 4, 2012, to both of which this application claims the benefit of priority, and the entirety of the subject matter of both of which is incorporated herein by reference.

FIELD OF THE DESCRIPTION

The present invention relates to a proppant for fractured earth having a high compressive strength and simultaneously a good conductivity. It also relates to an anti-flowback additive for use in fracturing operations.

BACKGROUND

Naturally occurring deposits containing oil and natural gas have been located throughout the world. Given the porous and permeable nature of the subterranean structure, it is possible to bore into the earth and set up a well where oil and natural gas are pumped out of the deposit. These wells are large, costly structures that are typically fixed at one location. As is often the case, a well may initially be very productive, with the oil and natural gas being pumpable with relative ease. As the oil or natural gas near the well bore is removed from the deposit, other oil and natural gas may flow to the area near the well bore so that it may be pumped as well. However, as a well ages, and sometimes merely as a consequence of the subterranean geology surrounding the well bore, the more remote oil and natural gas may have difficulty flowing to the well bore, thereby reducing the productivity of the well.

To address this problem and to increase the flow of oil and natural gas to the well bore, companies have employed the well-known technique of fracturing the subterranean area around the well to create more paths for the oil and natural gas to flow toward the well. As described in more detail in the literature, this fracturing is accomplished by hydraulically injecting a fluid at very high pressure into the area surrounding the well bore. This fluid must then be removed from the fracture to the extent possible to ensure that it does not impede the flow of oil or natural gas back to the well bore. Once the fluid is removed, the fractures have a tendency to collapse due to the high compaction pressures experienced at well-depths, which can be more than 20,000 feet. To prevent the fractures from closing, it is well known to include a propping agent, also known as a proppant, in the fracturing fluid. The goal is to be able to remove as much of the injection fluid as possible while leaving the proppant behind to keep the fractures open. As used in this application, the term "proppant" refers to any non-liquid material that is present in a proppant pack and provides structural support in a propped fracture. "Anti-flowback additive" refers to any material that is present in a proppant pack and reduces the flowback of proppant particles but still allows for production of oil at sufficient rates. The terms "proppant" and "anti-flowback additive" are not necessarily mutually exclusive, so a single particle type may meet both definitions. For example, a particle may provide structural support in a fracture and it may also be shaped to have anti-flowback properties, allowing it to meet both definitions.

Several properties affect the desirability of a proppant. For example, for use in deep wells or wells whose formation forces are high, proppants must be capable of withstanding high compressive forces, often greater than 10,000 pounds per square inch ("psi"). Proppants able to withstand these forces (e.g., up to and greater than 10,000 psi) are referred to as high strength proppants. If forces in a fracture are too high for a given proppant, the proppant will crush and collapse, and then no longer have a sufficient permeability to allow the proper flow of oil or natural gas. Other applications, such as for use in shallower wells, do not demand the same strength proppant, allowing intermediate strength proppants to suffice. These intermediate strength proppants are typically used where the compressive forces are between 5,000 and 10,000 psi. Still other proppants can be used for applications where the compressive forces are low. For example, sand is often used as a proppant at low compressive forces.

In addition to the strength of the proppant, one must consider how the proppant will pack with other proppant particles and the surrounding geological features, as the nature of the packing can impact the flow of the oil and natural gas through the fractures. For example, if the proppant particles become too tightly packed, they may actually inhibit the flow of the oil or natural gas rather than increase it.

The nature of the packing also has an effect on the overall turbulence generated through the fractures. Too much turbulence can increase the flowback of the proppant particles from the fractures toward the well bore. This may undesirably decrease the flow of oil and natural gas, contaminate the well, cause abrasion to the equipment in the well, and increase the production cost as the proppants that flow back toward the well must be removed from the oil and gas. Too much turbulence can also increase the Non-Darcy flow effect, discussed in more detail below, which may ultimately result in decreased conductivity.

The useful life of the well may also be shortened if the proppant particles break down. For this reason, proppants have conventionally been designed to minimize breaking. For example, U.S. Pat. No. 3,497,008 to Graham et al. discloses a preferred proppant composition of a hard glass that has decreased surface flaws to prevent failure at those flaws. It also discloses that the hard glass should have a good resistance to impact abrasion, which serves to prevent surface flaws from occurring in the first place. These features have conventionally been deemed necessary to avoid breaking, which creates undesirable fines within the fracture.

The shape of the proppant has a significant impact on how it packs with other proppant particles and the surrounding area. Thus, the shape of the proppant can significantly alter the permeability and conductivity of a proppant pack in a fracture. Different shapes of the same material offer different strengths and resistance to closure stress. It is desirable to engineer the shape of the proppant to provide high strength and a packing tendency that will increase the flow of oil or natural gas. The optimum shape may differ for different depths, closure stresses, geologies of the surrounding earth, and materials to be extracted.

The conventional wisdom in the industry is that spherical pellets of uniform size are the most effective proppant body shape to maximize the permeability of the fracture. See, e.g., U.S. Pat. No. 6,753,299 to Lunghofer et al. Indeed, the American Petroleum Institute's ("API's") description of the proppant qualification process has a section dedicated to the evaluation of roundness and sphericity as measured on the Krumbein scale. However, other shapes have been suggested in the art. For example, previously-mentioned U.S. Pat. No. 3,497,008 to Graham et al. discloses the use of "particles having linear, parallel, opposite surface elements including cylinders, rods, paralellepipeds, prisms, cubes, plates, and various other solids of both regular and irregular configurations." (Col. 3, lines 34-37.) According to that patent, the disclosed shape configuration has several advantages when used as a proppant, including increased conductivity over spherical particles (col. 4, lines 29-35), greater load bearing capacity for the same diameter as a spherical particle (col. 4, lines 36-38), a higher resistance to being embedded in the fracture wall (col. 4, lines 45-47), and a lower settling rate (col. 4, lines 58-60).

Another property that impacts a proppant's utility is how quickly it settles both in the injection fluid and once it is in the fracture. A proppant that quickly settles may not reach the desired propping location in the fracture, resulting in a low level of proppants in the desired fracture locations, such as high or deep enough in the fracture to maximize the presence of the proppant in the pay zone (i.e., the zone in which oil or natural gas flows back to the well). This can reduce the effectiveness of the fracturing operation. Ideally, a proppant disperses equally throughout all portions of the fracture. Gravity works against this ideal, pulling particles toward the bottom of the fracture. However, proppants with properly engineered densities and shapes may be slow to settle, thereby increasing the functional propped area of the fracture. How quickly a proppant settles is determined in large part by its apparent specific gravity. Engineering the apparent specific gravity of the proppant for various applications is desirable because an optimized apparent specific gravity allows a proppant user to better place the proppant within the fracture.

Yet another attribute to consider in designing a proppant is its acid-tolerance, as acids are often used in oil and natural gas wells and may undesirably alter the properties of the proppant. For example, hydrofluoric acid is commonly used to treat oil wells, making a proppant's resistance to that acid of high importance.

Still another property to consider for a proppant is its surface texture. A surface texture that enhances, or at least does not inhibit, the conductivity of the oil or gas through the fractures is desirable. Smoother surfaces offer certain advantages over rough surfaces, such as reduced tool wear and a better conductivity, but porous surfaces may still be desirable for some applications where a reduced density may be useful.

All of these properties, some of which can at times conflict with each other, must be weighed in determining the right proppant for a particular situation. In addition, one must also consider the economics of the operation, because stimulation of a well through fracturing is by far the most expensive operation over the life of the well. Proppants are typically used in large quantities, making them a large part of the stimulation cost.

Attempts have been made to optimize proppants and methods of using them. Suggested materials for proppants include sand, glass beads, ceramic pellets, and portions of walnuts. The preferred material disclosed in previously-mentioned U.S. Pat. No. 3,497,008 is a hard glass, but it also mentions that sintered alumina, steatite, and mullite could be used. Conventional belief is that alumina adds strength to a proppant, so many early proppants were made of high-alumina materials, such as bauxite. The strength of these high-alumina materials is believed to be due to the mechanical properties of the dense ceramic materials therein. See, e.g., U.S. Pat. Nos. 4,068,718 and 4,427,068, both of which disclose proppants made with bauxite.

Early high strength proppants were made using tabular alumina, which was a relatively expensive component. For this reason, the industry shifted from using tabular alumina to other alumina sources, such as bauxite. By the late 1970's, the development focus in the industry shifted from high strength proppants to intermediate or lower strength, lower density proppants that were easier to transport and use, and were less expensive. Over the next 20 years, the industry focused on commercialization of lower density proppants and they became commonly used. The primary method of reducing the density of proppants is to replace at least a portion of the higher density alumina with lower density silica. According to U.S. Pat. No. 6,753,299, "the original bauxite based proppants of the early 1970's contained >80% alumina (Cooke). Subsequent generations of proppants contained an alumina content of >70% (Fitzgibbons), 40% to 60% (Lunghofer), and later 30% to <40% (Rumpf, Fitzgibbons)." Thus, as to both product development and proppant use, there was a retreat in the industry from proppants manufactured from high-alumina materials.

As resources become more scarce, the search for oil and gas involves penetration into deeper geological formations, and the recovery of the raw materials becomes increasingly difficult. Therefore, there is a need for proppants that have an excellent conductivity and permeability under extreme conditions. Thus, there is a need for a new proppant material that exists in ample supply and that can offer the strength required to prop fractures in modern wells.

SUMMARY OF THE INVENTION

According to one embodiment consistent with the present invention, a proppant or anti-flowback additive is provided comprising a flash calcined clay. According to another embodiment consistent with the present invention a method of fracturing subterranean formations is also provided that comprises injecting a fluid comprising a first composition comprising a flash calcined clay. According to another embodiment consistent with the present invention, a method of making a proppant or anti-flowback additive is also provided that comprises sintering at least one flash calcined clay to form a proppant or anti-flowback additive.

In one aspect, the proppant or anti-flowback additive comprises a flash calcined kaolin clay. In another aspect, the proppant or anti-flowback additive comprises a flash calcined bauxitic kaolin. In another aspect, the proppant or anti-flowback additive can be selected from flash calcined ball-clay, flash calcined fireclay, flash calcined smectite clay, and flash calcined illite clay.

In another aspect, the proppant or anti-flowback additive can include substantially spherical ceramic particles having sphericity of 0.7 or greater on the Krumbein scale, such as for example a sphericity of 0.9 or greater on the Krumbein scale.

In another aspect, the proppant or anti-flowback additive can include at least a portion of ceramic particles that are rod-shaped. In one aspect, at least a portion of particles of the proppant or anti-flowback additive has an average length-to-width ratio of about 0.2:1 to about 20:1, for example about 1.5:1 to about 4:1, or about 4:1 to about 7:1.

In yet another aspect, the proppant or anti-flowback additive can include both rod-shaped particles and substantially spherical particles.

In another aspect, the proppant or anti-flowback additive can have an apparent specific gravity less than about 4.2, such as for example from about 1.5 to about 4.2. In yet another aspect, the proppant or anti-flowback additive can have a bulk density of about 0.5 g/cm$^3$ to about 2.5 g/cm$^3$, such as for example about 1.2 g/cm$^3$ to about 1.9 g/cm$^3$.

In another aspect, the proppant or anti-flowback additive of claim 1 wherein the proppant or anti-flowback additive can be coated with a natural or synthetic coating. In one aspect, the natural or synthetic coating can be selected from the group consisting of natural rubber; elastomers; butyl rubber; polyurethane rubber; starches; petroleum pitch; tar; asphalt; organic semisolid silicon polymers; dimethyl silicone; methylphenyl silicone; polyhydrocarbons; polyethylene; polypropylene; polyisobutylene; cellulose lacquer; nitrocellulose lacquer; vinyl resin; polyvinylacetate; phenol-formaldehyde resins; urea formaldehyde resins; acrylic ester resins; polymerized ester resins of methyl, ethyl and butyl esters of acrylic; polymerized ester resins of methyl, ethyl and butyl esters of alpha-methylacrylic acids; epoxy resins; melamine resins; drying oils; mineral waxes; petroleum waxes; urethane resins; phenolic resins; epoxide phenolic resins; polyepoxide phenolic resins; novolac epoxy resins; and formaldehyde phenolic resins.

In another aspect, the proppant or anti-flowback particles can have an average diameter of about 0.089 mm to about 3 mm, such as for example about 0.25 mm to about 1.7 mm. In another aspect, the proppant or anti-flowback additive particles can have an average mesh size of about 6 mesh to about 170 mesh, such as for example about 12 mesh to about 80 mesh.

In another aspect, the proppant or anti-flowback additive can include a composition selected from the group consisting of sintered bauxite, sintered kaolin, sintered meta-kaolin, sintered pure or technical grade alumina, sintered alumina-containing slag, and sintered zirconia.

In another aspect, the proppant or anti-flowback additive particles can have a crush strength of at least about 200 MPa, such as for example at least about 250 MPa.

In another aspect, a method of fracturing subterranean formations can comprised injecting a fluid comprising a first composition comprising a flash calcined clay. In another aspect, the method comprises providing a second composition having a different composition than the first composition.

In another aspect, a method of making a proppant or anti-flowback additive can include sintering at least one flash calcined clay to form a proppant or anti-flowback additive. In one aspect, the at least one flash calcined clay can be sintered at a temperature of about 1250° C. to about 1700° C.

In another aspect, a method of making a proppant or antiflowback additive can include milling to achieve a material with a first particle size distribution. In yet another aspect, the method of making a proppant or antiflowback additive can include milling to achieve a material with a second particle size distribution. In another aspect, the method can also include mixing the milled material having the first particle size distribution with the milled material having the second particle size distribution.

In another aspect, the milling can include ball milling. In another aspect, the milling can include jet milling. In another aspect, the milling can include sand grinding.

In another aspect, the milling results in a material having a d50 less than about 10 microns, such as for example less than about 3 microns or less than about 1.5 microns. In another aspect, the milling results in a material having 95 weight percent of its particles smaller than about 30 microns.

BRIEF DESCRIPTION OF THE FIGURES

FIG. 1 Crush strength diagram for Opacilite®, AGX 19, AGX 19 BM, MKo, and CK46.

DESCRIPTION OF THE INVENTION

Reference will now be made in detail to embodiments of the present invention. A high strength proppant and anti-flowback additive made using flash calcined clay is found to achieve superior conductivity and other benefits when used in hydraulic fracturing of subterranean formations surrounding oil and/or gas wells under relatively high closing pressures.

Calcined kaolin clay is normally prepared by heat-treating (calcining) a hydrous kaolin clay material. This serves to remove hydroxyl groups from the molecular structure (dehydroxylation). The calcination process typically causes significant modification of the crystal structure of the kaolin, leading to modification of the characteristics of the material. In particular, when a hydrous kaolin is calcined to about 500-600° C., an endothermic reaction occurs. Essentially all of the water associated with the uncalcined kaolin crystals is eliminated and an essentially amorphous (as measured by x-ray diffraction) material called metakaolin results. If the kaolin is heated to higher temperatures, further significant changes occur. The metakaolin undergoes an exothermic reaction (which typically occurs at about 900-980° C.). Such a material is then referred to as a "fully calcined kaolin".

Another way that calcined kaolin and metakaolin can be prepared is by a flash calcination process, conducted on particles of hydrous kaolin. In the flash calcination process, the hydrous kaolin clay is heated at an extremely fast rate, almost instantaneously, e.g. by exposure to a temperature greater than about 500° C. for a time not more than 5 seconds, and typically less than 1 second. The temperature is suitably for example in the range of from 550° C. to 1200° C.

Flash calcination of the hydrous kaolin particles (e.g. for less than about 1 second, for less than 0.5 second or for less than 0.1 second) gives rise to relatively rapid blistering of the particles caused by relatively rapid dehydroxylation of the kaolin. Water vapour is generated during calcination, which may expand extremely rapidly, in fact generally faster than the water vapour can diffuse through the crystal structure of the particles. The pressures generated are sufficient to produce sealed voids as the interlayer hydroxyl groups are driven off, and it is the swollen interlayer spaces, voids, or blisters between the kaolin platelets which typify flash calcined kaolins and give them characteristic properties.

The flash calcination process may be carried out by injecting the kaolin clay into a combustion chamber or furnace wherein a vortex is established to rapidly remove the calcined clay from the combustion chamber. One suitable furnace is described in U.S. Pat. Nos. 3,021,195 and 3,620,789. Another suitable furnace would for example be one in which a toroidal fluid flow heating zone is established. For example, reference is made here to WO-A-99/24360.

Following calcination, the flash calcined clay may be comminuted to the desired fineness and particle size distribution. Comminution may be achieved by use of conventional processing techniques such as sand grinding (e.g. wet sand grinding in suspension), milling (e.g. dry ball milling or fluid energy milling), centrifigation, particle size classification, filtration, drying and the like. Wet sand grinding is preferred, in which case the desired particle size reduction is typically achieved after a work input of about 110 kilowatt-hours per tonne, and the kaolin can optionals be filtered, dried (e.g., at 800° C.) and milled to provide the final product.

The flash calcined kaolin described herein typically has a specific gravity lower than hydrous kaolin, for example, equal to or less than 2.4, and desirably equal to or less than 2.2.

The flash calcined kaolin clay is typically in particulate form and may suitably, but not essentially, have a particle size distribution such that at least about 40 weight % is below 2 μm, and preferably up to about 75 weight % is below 2 μm. Fore example, the flash calcined clay can have a particle size distribution such that between about 50 and 65 wt. % are smaller than 2 μm. In one example, the d50 of the flash calcined clay can range from about 1.4 to 2 μm. In another example, the flash calcined clay can have about 55 wt. % of particles smaller than 2 μm and a d50 of about 1.7 micron. In addition, the flash calcined clays can have a surface area in the range of from 5 to 25 $m^2$ per gram. (as measured by the BET liquid nitrogen absorption method ISO 5794/1), such as for example about 10 to 20 $m^2$ per gram, or 12-14 $m^2$ per gram.

The flash calcined clay may be mixed with other additives to form the proppant or anti-flowback additive. For example, additives such as bauxite, kaolin, meta-kaolin, pure or technical grade alumina (about 98%-99.9% alumina by weight), alumina-containing slag, zirconia, silica, iron, alkali elements, such as calcium, magnesium, and sodium, and virtually any other mineral containing alumina may be used to provide added strength or to decrease the apparent specific gravity of the resultant proppant. To enhance plasticity or green strength, other additives such as smectites (including, for example, montmorillinite and bentonite) or other rheology modifiers may be added. Appropriate additives may be selected by those skilled in the art based on the goal of the blend.

Strength optimized, light-weight proppants consistent with embodiments of the present invention may have various shapes, such as rods or spheres.

In accordance with one embodiment of the present invention, the proppant may take the form of spherical particles. Methods of making spherical particles are known in the art, and include various pelletization techniques.

A dry pelletizing process commonly used in the proppant manufacturing industry is described in U.S. Pat. No. 4,427,068 to Fitzgibbon. During this dry pelletizing process, a mixing device such as an Eirich Mixer having a horizontal or inclined circular table and capable of rotating at a speed of from about 10 to about 60 revolutions per minute is used to mix a ground dry power of the desired base material for forming the pellets. A rotatable impact impeller is provided inside the circular table, which rotates in an opposite direction to the rotational direction of the circular table and causes the material added to the mixer to flow over itself in a countercurrent manner. While the circular table and the impact impeller are both rotating, the dry powder for forming the pellets is continually added until the desired size of unsintered pellets is formed.

In another dry pelletizing technique, extruded, molded, or granulated rods with a 1:1 length-to-width ratio are prepared and then placed in a mixer, such as an Eirich mixer, and are allowed to rub against each other to increase their sphericity. Alternatively, or in addition to using a mixer, the rods may be placed in a simple spheralizer known to those skilled in the art. The spheralizer may, for example, comprise an inclined rotating cylinder operating in batch mode.

Another known method for pelletizing spheres is a wet method. This method involves preparing an aqueous feed from the desired pellet materials and continuously atomizing the feed into a layer of already partly dried particles made from the same pellet material that is fluidized in a stream of drying air. The formed pellets are continuously retrieved from the layer and separated into desired sizes before sintering. Other pelletization techniques will be apparent to those skilled in the art, and may be used without departing from the spirit of the invention.

The pellets should then be sintered to achieve the desired composition and structure. Once the spherical particles are formed, they are dried and sintered at temperatures from about 1,250° C. to about 1,700° C.

Spherical proppants using the above methods typically have a sphericity of 0.7 or greater on the Krumbein scale. In some embodiments, the proppants or anti-flowback additives may achieve a sphericity of 0.9 or higher. As used herein, the term "substantially spherical" refers to proppants or anti-flowback additives having a sphericity of 0.7 or greater on the Krumbein scale.

Once the spheres have been sintered, they are collected and sorted by size using any method known to those skilled in the art. For example, they may be sorted through by centrifugation or sieving according to the dimensions specified in the U.S. Standard Sieve Series commonly used within the art.

A sieving analysis may involve a number of steps. In accordance with one embodiment of the present invention, sieves of desirable sizes are cleaned to ensure that they are free of loose proppants, resins, or dust. The sieves are then weighed individually and stacked on top of each other inside a base pan with the lowest sieve size (i.e., the one with the largest holes) at the top and the largest sieve size at the bottom.

The collected spheres are separated into batches of about 80 grams and weighed. Each batch is then poured into the top sieve of the stack. A lid is place upon this top sieve and firmly secured in place by an "O" ring. The stack of sieves is placed on a sieve shaker and shaken for about 10 minutes. After shaking, the sieves are individually weighed again along with the spheres that were held by the sieve. The previously recorded sieve weight is subtracted from the total sieve weight with the spheres to determine the weight of the spheres at a particular sieve size.

The total weight of the spheres in all sieves is calculated and compared to the initially recorded weight of the spheres prior to sieving to identify procedural errors. If the weight difference is within an allowable range, such as about 1%, then the process is considered to be valid and the weight of the spheres in each sieve is calculated as a percentage of the total weight of spheres from all the sieves. In this way, the sieving analysis provides an assessment of the percentages of spheres produced at various sizes in accordance with one embodiment of the present invention.

In some embodiments, the spheres for use as proppants are formed to an average diameter of about 0.089 mm to about 3 mm, which corresponds to a mesh size of about 6 to about 170 mesh. In other embodiments, the spheres for use as proppants are formed to an average diameter of about 0.1 mm to about 3 mm, which corresponds to a mesh size of about 6 to about 140 mesh. In some embodiments, it may be desirable to restrict the size ranges of the spheres from about 0.2 mm to about 2 mm, which corresponds to about 10 to about 80 mesh. It may be further desirable in some embodiments to further restrict the size of the spheres from about 0.2 mm to about 1.7 mm, which corresponds to about 12 to about 80 mesh. The choice of size may depend upon considerations such as the intended fracture depth, the choice of carrier fluid, or other factors known to those skilled in the art.

The apparent specific gravity and bulk density of the spherical particles is similar to the rod-shaped particles discussed above. Sintered spheres prepared as described above may have an apparent specific gravity of up to about 4, or perhaps even higher depending on what additives are selected. For certain applications, apparent specific gravities of less than 4, less than 3.9, or less than 3.2 may be desirable. In other applications, an apparent specific gravity of 2.7 or less is desirable. In certain embodiments, the apparent specific gravity may be as low as 2.0, or even as low as 1.5 while in other embodiments it may be as low as 2.5. The particular apparent specific gravity range chosen may be based on a variety of factors including, for example, the intended use, which may involve considerations such as fracture depth, the type of carrier fluid, etc.

While "specific gravity" is known in the art to refer to the weight per unit volume of a material as compared to the weight per unit volume of water at a given temperature, "apparent specific gravity" as used in this application refers to the weight per unit volume of a material including only the material itself and its internal porosity as compared to the weight per unit volume of water. Thus, in the apparent specific gravity computation first the weight of the material being measured is determined. Then the volume of the material, including only the volume of the material and its internal pores, is determined. For some materials, this step is easily accomplished by placing the material in water and measuring the volume of the displaced water. Indeed, under certain circumstances water may appropriately be used for applications that compare one proppant to another, such as in the void volume experiments described above. For proppants of this type, however, water may permeate and fill in the interior pores, giving inaccurate absolute results such as those desired when computing apparent specific gravity. Consequently, it is necessary to measure the displacement in mercury or some similar fluid that will not permeate the material and fill its internal pores. The weight per unit volume measured in this manner is then compared to the weight per unit volume of water at a given temperature. The specific temperature used in accordance with this application is room temperature, or about 25° C.

The sintered spheres may have a bulk density of about 0.5 g/cm³ to about 2.5 g/cm³. In some embodiments, the bulk density may be below about 2.0 g/cm³, about 1.7 g/cm³, about 1.5 g/cm³, or about 1.4 g/cm³. For the lower end of the range, in some embodiments the bulk density may be above about 1.0 g/cm³ or about 1.2 g/cm³.

"Bulk density" as used in this application and understood within the art refers to the mass of a particular volume of particles divided by the volume occupied by the particles where the mass has been compacted. This is sometimes referred to as "packed" or "tapped" bulk density. The measurement method of the "packed" or "tapped" bulk density is that set forth by the Federation of European Producers of Abrasives (FEPA) as standard number 44-D. The volume used for the calculation of bulk density includes both the space between the particles and the pore spaces (both interior and exterior) of the particles.

In accordance with another embodiment of the present invention, a high-strength proppant takes the form of a rod-shaped particle prepared by sintering flash calcined clay alone or in combination with other materials. The rod-shaped particle may have a solid trunk bounded by two substantially parallel planes. In one embodiment of the present invention, the two substantially parallel planes may be substantially circular, thereby creating a cylindrical trunk. Other suitable shapes may be also be used as the bounding planes, although it is useful for the bounding planes to have a minimum number of angles, such as circles, ovals, or other symmetrical or asymmetrical shapes with rounded edges, such as egg curves. Angular particles tend to pack more tightly together and concentrate the pressure on the contact points between the particles because of their sharp edges, which can lead to increased pressure and an increased likelihood that the proppant will undesirably break into fine particles. Angular shapes, such as triangles, squares, rectangles, etc., where one or more of the corners is rounded may also be used as the bounding planes without departing from the spirit of the present invention. The rod bounded by these different shapes may take on trunks of different shapes, for example, in the shape of a triangular prism, without departing from the spirit of the present invention.

The sintered rods may be formed to virtually any diameter and length suitable for use as a proppant or anti-flowback additive. In one embodiment of the present invention, the sintered rod has parallel bounding planes that are substantially circular, where the substantially circular planes have an average diameter of about 0.5 mm to about 2 mm. In some embodiments, the preferred diameters may be about 0.5 mm to about 1.5 mm. Sintered rods having a length of up to about 20 mm, preferably up to 10 mm, may be suitable for use as proppants or anti-flowback additives in accordance with embodiments of the present invention. In some embodiments, the preferred rod length may be of about 1 mm to about 5 mm, or more preferably of about 1 mm to about 4 mm.

A sintered rod having the above dimensions may have virtually any length-to-width ratio (this term is also intended to encompass the length to diameter ratio, if the rod has a substantially circular cross-section). For example, in some embodiments it may be desirable to have a length-to-width ratio of about 0.2:1 to about 20:1. In some embodiments, it may be desirable that the length-to-width ratio be of about 1.5:1 to about 10:1, more preferably of about 1.5:1 to about 7:1. It may be further preferable to restrict the length-to-width ratio of about 2:1 to about 4:1 in some embodiments. Although not required, in some embodiments it may be desirable that the sintered rod have a length-to-width ratio of greater than 1:1 because the elongated shape may introduce more disorder into the proppant pack, thereby increasing void spaces between the proppants resulting in an increased conductivity for the proppant pack.

While various particle sizes and size distributions may be useful in preparing proppants and anti-flowback additives, the pre-milled alumina-containing material may have at least 95% of its particles smaller than 500 microns as measured by sieving or a Microtrac particle size analyzer, and may have all of its particles smaller than 500 microns. After milling, in certain embodiments the material has a d50 of less than 10 microns, and may have a d50 of less than 5 microns, less than 3 microns, or even less than 1.5 microns. In one embodiment, the powder has a d50 from 1.5 microns to 2 microns, and ratio of the d90 to the d10 from 4 to 8. The d10, d50, and d90 may be measured using a laser microsizer, such as the Malvern Mastersizer 2000. The milled material may also have substantially all of its particles smaller than 30 microns. A broad particle size distribution is preferred to a narrow one if enhanced strength is the goal, as it is believed that the broader distribution results in an increase of the compacity of the material and the strength of the final sintered rod.

The formed particle is then sintered at about 1250° C. to about 1,700° C. to form the sintered rod suitable for use as a proppant or anti-flowback additive. In some embodiments, the sintering temperature is about 1,400° C. to about 1,600° C. The sintering equipment may be any suitable equipment known in the industry, including, for example, rotary, belt, or vertical furnaces, or tunnel or pendular sintering equipment.

The sintered particles may optionally be coated with one or more coatings. Applying such a coating can provide various advantages, including the ability to control the dispersion of fines that may be generated when the rods break under injection or closure pressures. Many coatings have been suggested in the art, with U.S. Pat. No. 5,420,174 to Dewprashad providing the following non-exhaustive list of natural and synthetic coatings: "natural rubber, elastomers such as butyl rubber, and polyurethane rubber, various starches, petroleum pitch, tar, and asphalt, organic semisolid silicon polymers such as dimethyl and methylphenyl silicones, polyhydrocarbons such as polyethylene, polypropylene, polyisobutylene, cellulose and nitrocellulose lacquers, vinyl resins such as polyvinylacetate, phenolformaldehyde resins, urea formaldehyde resins, acrylic ester resins such as polymerized esters resins of methyl, ethyl and butyl esters of acrylic and alpha-methylacrylic acids, epoxy resins, melamine resins, drying oils, mineral and petroleum waxes." Additional coatings include urethane resins, phenolic resins, epoxide phenolic resins, polyepoxide phenolic resins, novolac epoxy resins, and formaldehyde phenolic resins. One or more of these coatings can be applied to the sintered particles using any known method, including both batch and on-the-fly mixing.

The proppant or anti-flowback additive of the present invention may be used alone or in combination with one or more proppants known in the art, including, but not limited to ceramic proppants, resin-coated ceramic proppants, sand (such as Ottawa frac sand or zircon sand), resin-coated sand, resin-impregnated natural materials, walnut shells, synthetic organic particles, glass microspheres, sintered bauxite, silica beads, metal particles, and any other materials currently used in the industry to prop open a fracture.

Examples—Spherical Particles

Spherical proppants were prepared using the following materials and mixtures:

1. Opacilite flash calcined kaolin (obtained from Imerys® Performance Minerals)
2. AGX 19 flash calcined kaolin (obtained from VKV®)
3. AGX 19 BM (same as above but ball milled)
4. MKo rotary calcined metakaolin (obtained from VKV®)
5. CK46 rotary calcined metakaolin (obtained from C-E Minerals®)

5 kg of the flash calcined kaolin (metakaolin) was put into a polyurethane lined ballmill containing 6 kg of various sized (2 cm to 5 cm diameter) alumina balls. 22 liters of water was added to the ball mill so as to produce a 18.5 wt % solids metakaolin slurry. This low solids slurry did not require a dispersant to aid attrition. The ball mill was left to run for 24 hours. The slurry and grinding media were separated using a 1 mm sieve on a vibrating table. The slurry was dewatered using conventional filtration techniques and dried in an oven at 80° C.

The materials, which were all dry powders, were then formed into spherical pellets using a dry pelletizing technique. Specifically, Specifically, the materials were blended in an Eirich Mixer (a 10 L unit with an inclined pan). The pan and the agitator were turned to the high setting to mix the powders. Water containing poly-vinyl-acetate (for use as a binder) was then added progressively to obtain a suitable consistency for pelletization. The moisture level and speed of the agitator arm were adjusted to tune the size of the pellets formed. The mixing lasted between 2 and 10 minutes. Once beads of the desired size were formed (diameters of about 0.4 mm to about 1.5 mm), the impeller arm was stopped but the pan was left to rotate to improve the roundness of the pellets. The pellets were then oven-dried and screened to obtain a collection of pellets having diameters of about 0.6 mm to about 1.0 mm. The pellets were then fired in a muffle furnace that increased the temperate by 10° C./minute until the target temperature of about 1600° C. was achieved. That temperature was held for approximately 1 hour, and the furnace was then cooled down. The sintered pellets were then screened to a size of 20-30 mesh, using US standard sieve sizes.

Crush tests were then performed on each of the samples. In this test, 10 to 20 pellets were placed on a flat surface and compressed with another flat surface until they failed. The force exerted was noted, as well as the diameters of the pellets. The force withstood was then normalized and converted into a compressive pressure by dividing the force by the cross-sectional area of the pellets. The results, which indicate what we refer to in this application as "crush strength," are shown below in Table 1 and FIG. 1. In some instances, multiple tests were performed, and the table reflects the average results of those tests.

TABLE 1

| Starting Material | Specific Gravity | Crush Test Results |
|---|---|---|
| Opacilite ® | 2.63 | 289 MPa |
| AGX 19 | 2.61 | 243 MPa |
| AGX 19 BM | 2.69 | 286 MPa |
| MKo | 2.69 | 221 MPa |
| CK46 | 2.71 | 252 MPa |

Using the same test as above, a series of commercial proppant products offered by Carbo Ceramics, Inc. having a 20/40 mesh size range were tested as controls. The results are shown in Table 2 and FIG. 1.

TABLE 2

| Control Sample | Specific Gravity | Crush Test Results |
|---|---|---|
| CarboHSP 20/40 | 3.53 | 376 MPa |
| CarboProp 20/40 | 3.29 | 323 MPa |
| CarboLite 20/40 | 2.71 | 211 MPa |
| CarboEconoprop 20/40 | 2.67 | 182 MPa |

Commercial controls CarboLite 20/40 and CarboEconoprop 20/40 yielded a crush strength of 211 MPa and 182 MPa respectively, significantly lower than any of the inventive samples comprising flash calcined clays at comparable or lower specific gravities. Indeed, the average result for the Opacilite® and AGX 19 BM samples is almost as high as the CarboProp® 20/40 product offered by Carbo Ceramics, Inc., which had a crush strength of 323 MPa but has an apparent specific gravity significantly higher than samples made from flash calcined clays Opacilite® and AGX 19 BM.

The collective results of these tests indicate that proppants made using flash calcined clay can provide sufficient strength to be of value to the oil and natural gas industries.

The preceding description is merely exemplary of various embodiments of the present invention. Those skilled in the art will recognize that various modifications may be made to the disclosed embodiments that would still be within the scope of the invention. The scope of the invention is intended to be limited only by the appended claims.

What is claimed is:

1. A proppant or anti-flowback additive comprising sintered ceramic particles formed from a flash calcined clay.

2. The proppant or anti-flowback additive of claim 1, wherein the flash calcined clay comprises flash calcined kaolin clay.

3. The proppant or anti-flowback additive of claim 1, wherein the flash calcined clay comprises flash calcined bauxitic kaolin.

4. The proppant or anti-flowback additive of claim 1, wherein the flash calcined clay is selected from flash calcined ball-clay, flash calcined fireclay, flash calcined smectite clay, and flash calcined illite clay.

5. The proppant or anti-flowback additive of claim 1, wherein the ceramic particles have a sphericity of 0.7 or greater on the Krumbein scale.

6. The proppant or anti-flowback additive of claim 1, wherein at least a portion of the ceramic particles are rod-shaped.

7. The proppant or anti-flowback additive of claim 1, wherein the proppant or anti-flowback additive has an apparent specific gravity of about 1.5 to about 4.2.

8. The proppant or anti-flowback additive of claim 1, wherein the proppant or anti-flowback additive has a bulk density of about 0.5 g/cm3 to about 2.5 g/cm$^3$.

9. The proppant or anti-flowback additive of claim 1, wherein the proppant or anti-flowback additive is coated with a natural or synthetic coating.

10. The proppant or anti-flowback additive of claim 1, wherein the particles have an average diameter of about 0.089 mm to about 3 mm.

11. The proppant or anti-flowback additive of claim 1, wherein the particles have an average mesh size of about 12 mesh to about 80 mesh.

12. The proppant or anti-flowback additive of claim 1, wherein the proppant or anti-flowback additive comprises rod-shaped particles and substantially spherical particles.

13. The proppant or anti-flowback additive of claim 1, wherein the proppant or anti-flowback additive has a crush strength of at least about 200 MPa.

14. A method of fracturing subterranean formations comprising injecting a fluid comprising a proppant or anti-flowback additive according to claim 1.

15. A method of making a proppant or anti-flowback additive comprising:
    providing a ceramic precursor composition comprising a flash calcined clay;
    pelletizing the ceramic precursor composition; and
    sintering the pelletized ceramic precursor composition to form a proppant or anti-flowback additive.

16. The method of claim 15, wherein the at least one flash calcined clay comprises flash calcined kaolin.

17. The method of claim 15, further comprising milling to achieve a material with a first particle size distribution.

18. The method of claim 17, further comprising milling to achieve a material with a second particle size distribution.

19. The method of claim 17, wherein the milling results in a material having a d50 less than 10 microns.

20. The method of claim 15, wherein the at least one flash calcined clay mineral has been sintered at a temperature of about 1250° C. to about 1700° C.

* * * * *